US006497302B2

(12) United States Patent
Ryan (10) Patent No.: US 6,497,302 B2
(45) Date of Patent: Dec. 24, 2002

(54) SCUTTLE AREA AIR BAG FOR PEDESTRIAN PROTECTION

(75) Inventor: Shawn Gregory Ryan, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/741,753

(22) Filed: Dec. 19, 2000

(65) Prior Publication Data

US 2002/0074775 A1 Jun. 20, 2002

(51) Int. Cl.$^7$ .............................................. B60K 28/14
(52) U.S. Cl. .................... 180/274; 180/271; 280/730.1; 280/762
(58) Field of Search ............... 280/728.1, 2, 730.1, 280/762; 180/274, 271

(56) References Cited

U.S. PATENT DOCUMENTS

| 4,249,632 A | * | 2/1981 | Lucchini et al. ............ 180/274 |
| 5,232,244 A | * | 8/1993 | Itoh ............................ 280/749 |
| 5,803,486 A | * | 9/1998 | Spencer et al. ........... 280/728.2 |
| 6,182,782 B1 | * | 2/2001 | Matsuura et al. ............ 180/274 |
| 6,224,088 B1 | * | 5/2001 | Lohavanijaya ........... 280/728.2 |

FOREIGN PATENT DOCUMENTS

| DE | 100 14 832 A1 | * | 10/2001 | ................. 180/274 |
| JP | 2000264146 | * | 9/2000 | ................. 180/274 |

* cited by examiner

*Primary Examiner*—Paul N. Dickson
*Assistant Examiner*—Deanna Draper
(74) *Attorney, Agent, or Firm*—Kathryn A. Marra (57) ABSTRACT

An air bag assembly for use in a vehicle at a location exterior to the passenger compartment. The air bag assembly includes an inflator for discharging inflation gas and a gas receiving expansible air bag cushion disposed in fluid communication with the inflator such that upon release of inflation gas from the inflator, the air bag cushion is deployed across a region immediately below the windshield of the vehicle as well as over the lower portion of the windshield and adjacent frame pillar elements surrounding the windshield. The extent of coverage over the windshield is such that the vehicle operator retains a degree of visibility over the deployed air bag cushion after deployment has taken place.

14 Claims, 5 Drawing Sheets

SCUTTLE AREA AIR BAG FOR PEDESTRIAN PROTECTION

TECHNICAL FIELD

This invention relates to an air bag assembly for use in a vehicle and more particularly to an air bag assembly including an inflatable cushion deployable from a storage location adjacent the lower edge of the vehicle windshield so as to extend over the lower portion of the vehicle windshield and the scuttle area between the lower edge of the vehicle windshield and the outwardly extending hood.

BACKGROUND OF THE INVENTION

It is well known in the prior art to provide an air bag assembly including an inflatable air bag for protecting passengers seated within the interior of the vehicle. Such inflatable air bags may be deployable from a number of different locations at the interior of the vehicle including the steering column, the dash panel, the side doors, and the interior roofline. Such inflatable air bags may have a number of different configurations and inflation characteristics depending upon the location of deployment and the desired function. By way of example, air bag cushions which are deployable from the steering column and dash panel are typically rapidly inflated and thereafter decompressed as the occupant to be protected comes into contact with the air bag cushion. Alternatively, it is known to utilize air bags of generally curtain-like configuration deployable from the interior roof line which may thereafter remain inflated for an extended period of time so as to provide cushioning restraint during an extended roll over event lasting several seconds.

Air bag assemblies as are known in the prior art typically include a gas generating inflator which is stored in fluid communication with the inflatable air bag cushion. Upon sensing predetermined vehicle conditions, such as a certain amount of vehicle deceleration, a sensor sends a signal to the inflator thereby triggering the discharge of inflation gas into the air bag cushion. As the inflation gas enters the air bag cushion, the air bag cushion is forced into a deployed position for protection of the occupants within the interior of the vehicle. While the deployment of previously known air bag cushions within the interior of the vehicle may provide substantial benefits to the occupants of the vehicle, such systems provide no benefit to persons at the exterior of the vehicle. By way of example, in the event of a collision between a standard automobile and a bicycle operator or pedestrian, it is known that interaction may take place between the exterior surfaces of the automobile and such bicycle operator or pedestrian which interactions are not subject to cushioning by air bag cushions deployed at the interior of the vehicle. Injury may result in the event that the head of the person impacts outer surfaces of the vehicle which are not readily deformable and thus do not provide intrinsic energy dissipation.

SUMMARY OF THE INVENTION

The present invention offers advantages and alternatives over the prior art by providing an air bag assembly which is deployable over the lower portion of the vehicle windshield and the so-called scuttle area of the vehicle body adjacent the lower portion of the vehicle windshield so as to provide a cushion for persons outside the vehicle who may come into contact with such vehicle portions during a collision event and to thereby reduce the likelihood of injury to the head and other portions of the person's body.

According to a potentially preferred feature of the present invention, the air bag cushion is deployable from a location which is substantially hidden from view by the hood of the vehicle prior to deployment.

According to another potentially preferred feature, the air bag cushion according to the present invention is characterized by a height dimension such that the air bag cushion extends only partially up the windshield of the vehicle during deployment thereby permitting the operator of the vehicle to maintain visibility with the exterior environment subsequent to the deployment of the air bag cushion.

According to yet a further potentially preferred feature of the present invention, the air bag cushion is characterized by a flared width dimension so as to provide coverage over at least a portion of the structural pillar elements extending between the windshield and the forward side windows of the vehicle.

According to one aspect of the present invention, these features are incorporated in a potentially preferred form of the invention by providing an air bag assembly for use in a vehicle at a location exterior to the passenger compartment. The air bag assembly preferably includes an inflator for discharging inflation gas and a gas receiving expansible air bag cushion disposed in fluid communication with the inflator such that upon release of inflation gas from the inflator, the air bag cushion is deployed across a region immediately below the windshield of the vehicle as well as over the lower portion of the windshield and adjacent portions of the frame surrounding the windshield. The extent of coverage over the windshield is preferably such that the vehicle operator retains a degree of visibility over the deployed air bag cushion after deployment has taken place. The materials forming the air bag cushion are preferably of an extremely low gas permeability and preferably comprise a textile material including an internal or external permeability blocking layer of suitable character. The total inflated volume of the air bag cushion is preferably relatively low so as to permit the use of a single low volume inflator if desired. Thus, this invention provides a system of unobtrusive character for cushioning the impact of a person external to the occupant compartment of an automotive vehicle which advantageously covers portions of the vehicle exterior against which such a person may be likely to come into contact during an impact event with the vehicle. In addition, the air bag cushion does not substantially obstruct the vision of the vehicle operator upon deployment and thereby permits the operator to engage in the continued operation of the vehicle in an appropriate manner.

BRIEF DESCRIPTION OF THE DRAWINGS

The accompanying drawings which are incorporated in and which constitute a part of this specification, illustrate potentially preferred embodiments of the present invention and, together with the general description of the invention given above and the detailed description set forth below, serve to explain the principles of the invention wherein.

While the invention has been illustrated and generally described above and will hereinafter be described in connection with certain potentially preferred embodiments and practices, it is to be understood that in no event is the invention to be limited to such illustrated and described embodiments and practices. On the contrary, it is intended that the present invention shall extend to all embodiments and practices including alternatives and modifications as may embrace the principles of this invention within the true spirit and scope thereof.

DESCRIPTION OF THE PREFERRED EMBODIMENT

Figure 1:
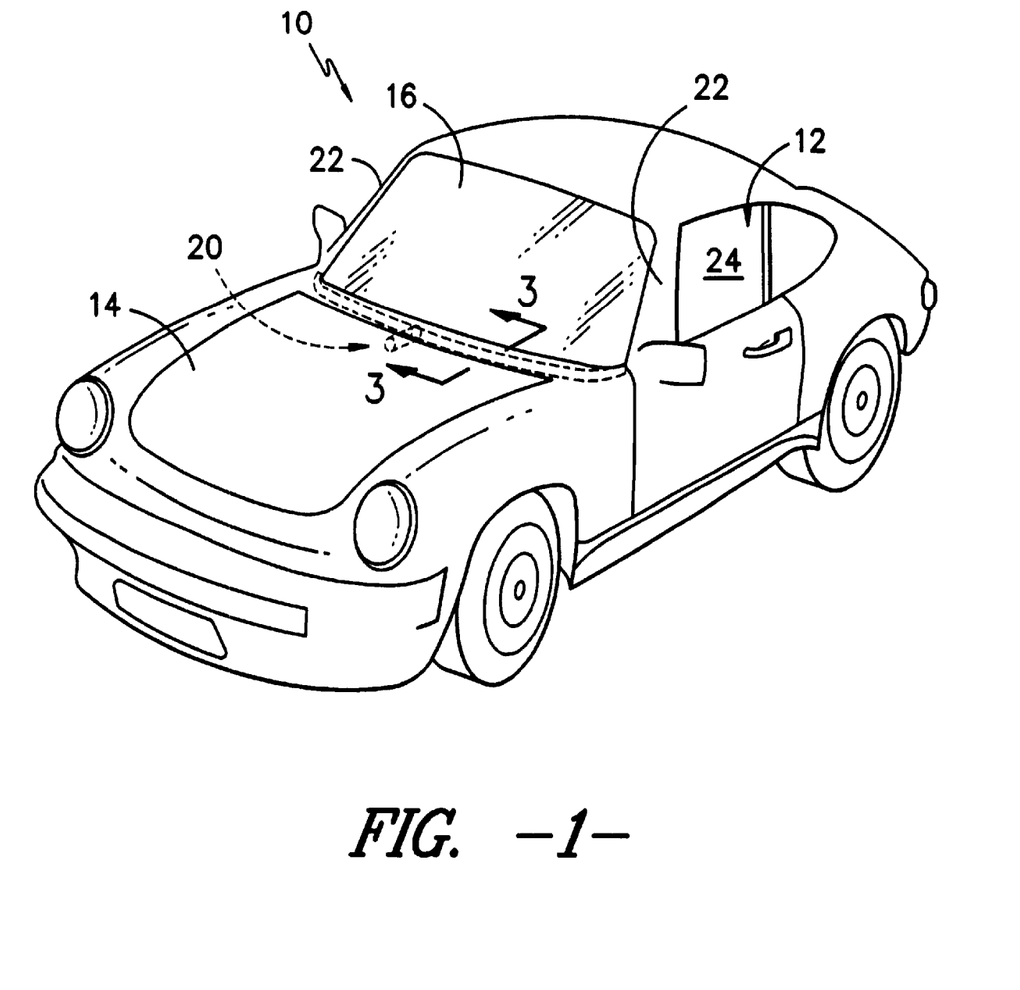
FIG. 1 is a perspective view of an automotive vehicle showing in hidden lines an air bag assembly according to the present invention prior to activation.

Referring now to the drawings wherein to the extent possible like reference numerals are used to designate like components throughout the various views. In FIG. 1 there is illustrated a vehicle 10 including a passenger compartment 12 for housing one or more vehicle occupants (not shown). The vehicle 10 further includes an outwardly projecting hood portion 14 extending forward from a position generally adjacent a windshield 16. Disposed at a location below the hood portion 14 in the region generally adjacent to the windshield 16 is an air bag assembly 20 as will be discussed further hereinafter.

As will be understood, the windshield 16 is preferably formed of a substantially clear glass or other suitable material and extends in a broad expanse in front of the passenger compartment 12 so as to afford the operator of the vehicle and other occupants a view of the region in front of the vehicle 10. In order to secure the windshield 16 in place, it is mounted within a frame including side pillars 22 which extend between the windshield 16 and side windows 24. As will be appreciated by those of skill in the art, the side pillars 22 are generally formed of metal and are substantially rigid in character. The region of the vehicle 10 which extends generally along the lower edge of the windshield 16 at the intersection between the hood portion 14 and the windshield 16 is commonly referred to as the so-called "scuttle area". As will be appreciated by those of skill in the art, in the event of an impact between the vehicle 10 and a person external to the passenger compartment 12, this so-called scuttle area may constitute a region of velocity terminating impact between the vehicle 10 and such external person due to the fact that such region constitutes a transition between the generally horizontal hood portion 14 and the substantially vertical windshield 16 and side pillars 22. In some instances, a person involved in such an impact may suffer head injuries as impact takes place.

Figure 2:
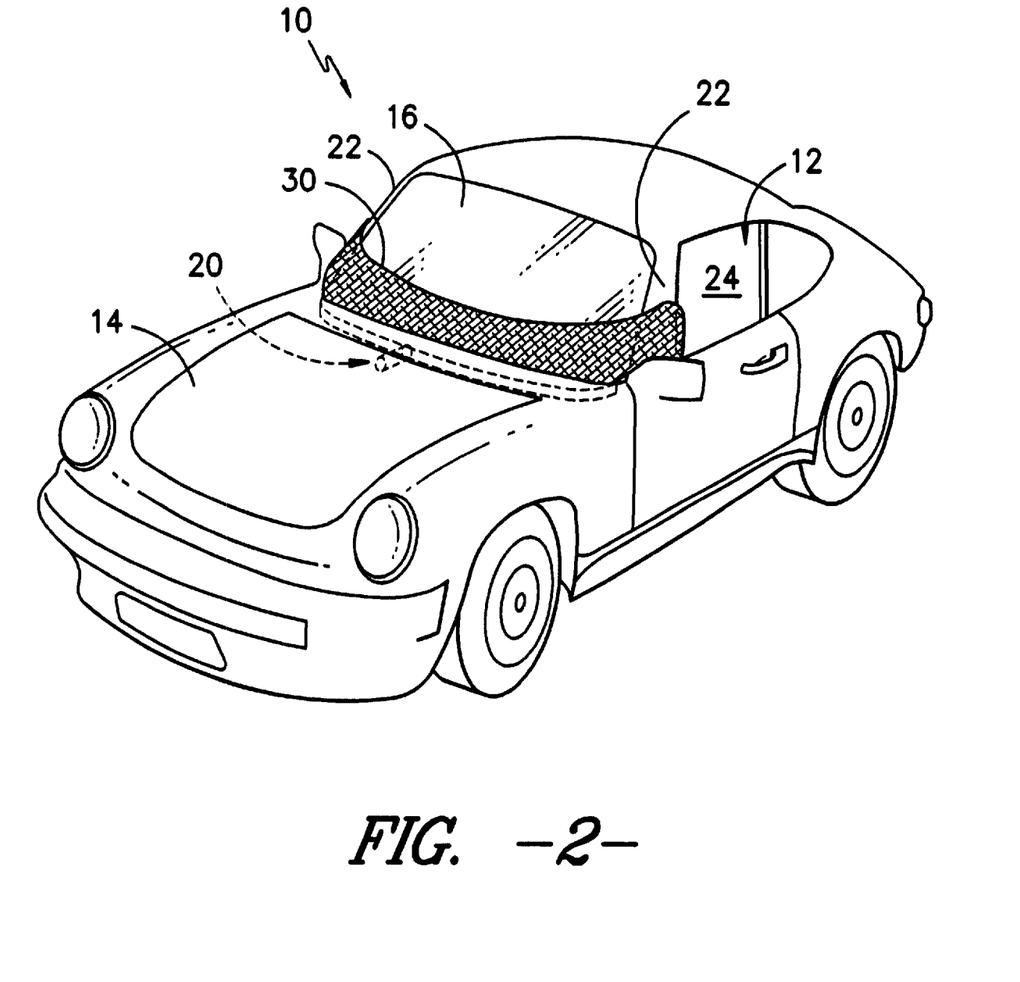
FIG. 2 is a view similar to FIG. 1 wherein an air bag assembly according to the present invention is shown in a deployed state.

Referring now to FIG. 2, according to the present invention, upon the occurrence of predefined vehicle conditions such as deceleration exceeding a certain level and/or the activation of one or more impact sensors within the body of the vehicle 10 sensing impact with an external object, and/or the activation of one or more scanning visual sensors measuring the relative proximity of an external object, an inflatable air bag cushion 30 will be deployed in covering relation to the scuttle area and the lower portion of the windshield 16. According to the illustrated and potentially preferred embodiment, the air bag cushion will preferably have a width dimension sufficient to effect coverage over at least a portion of the side pillars 22. As illustrated, the air bag cushion 30 preferably covers only the lower portion of the windshield 16 below the line of forward sight for an operator so as to provide the operator of the vehicle with a continuous external view of the external environment thereby permitting the operator to carry out any required maneuver even after deployment has taken place. As shown, according to the potentially preferred configuration of the air bag cushion 30, the upper edge of the air bag cushion 30 will preferably be of a substantially concave profile so as to substantially enhance the ability of the operator to see through the windshield 16 while at the same time providing relatively extensive coverage over the side pillars 22. In addition, it is believed that the concave profile across the upper edge may be beneficial in facilitating the use of the intrinsic energy absorption characteristics at the interior of the windshield 16 while nonetheless covering the rigid portions of the vehicle exterior that do not exhibit substantial energy absorptive deformation upon impact.

Figure 3:
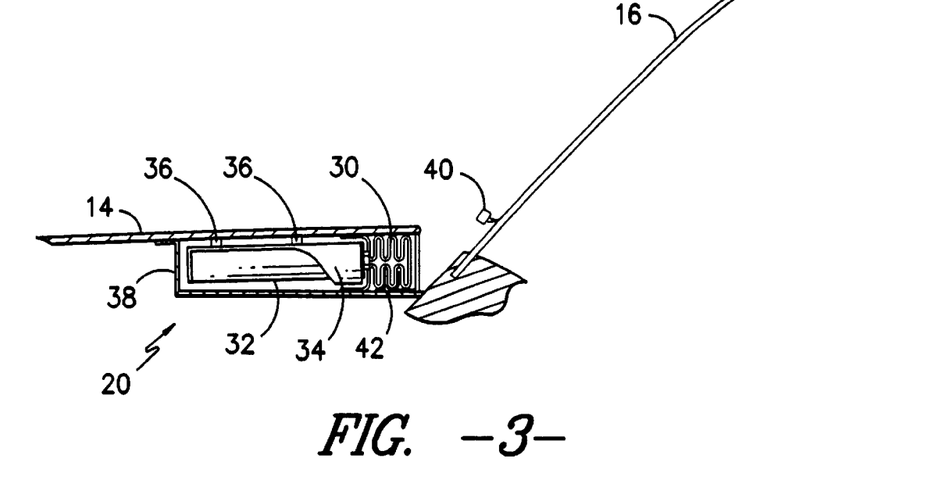
FIG. 3 is a cut-away side view of an air bag assembly according to the present invention taken generally line 3—3 in FIG. 1.
Figure 4:
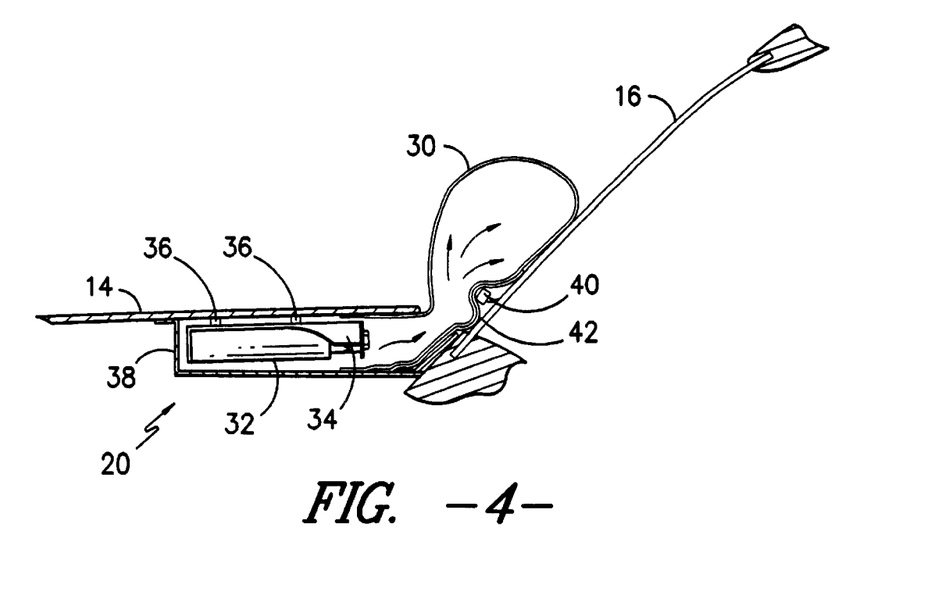
FIG. 4 is a view similar to FIG. 3 and illustrating an air bag assembly according to the present invention in partial deployment.

Referring now to FIGS. 3 and 4 it is contemplated that the air bag assembly 20 will preferably include a generally cylindrical gas generating inflator 32 held within a bracket structure 34 in a manner as described in U.S. Pat. No. 5,803,486 (incorporated by reference). The bracket structure in turn is secured to the underside of the hood portion 14 by fastening members 36 such as snap elements or the like as will be well known to those of skill in the art. The air bag cushion 30 and the inflator 32 are preferably stored within a suitable housing 38 which is enclosed against the environment.

As illustrated in FIG. 4, upon activation of the air bag assembly, inflation gas is expelled from the inflator 32 and into the air bag cushion 30. As pressure is built within the air bag cushion 30, the air bag cushion 30 is forced out of the housing 38 and travels upwardly along the windshield 16 to achieve a deployed configuration substantially as illustrated in FIG. 2. As will be appreciated, during such deployment the air bag cushion 30 may be required to pass over windshield wipers 40 or other elements projecting away from the surface to be covered. In order to promote relatively smooth travel over such outwardly projecting elements, it is contemplated that the air bag cushion 30 may incorporate a layer of skirting material 42 which is attached to the air bag cushion 30 in the region which passes over such outwardly projecting elements thereby reducing the probability of the air bag cushion becoming caught on the windshield wipers 40 or other outwardly projecting objects. The layer of skirting material 42 may be formed of materials which are either similar or dissimilar to the material forming the air bag cushion 30. According to a potentially preferred construction, the layer of skirting material will be formed of a woven fabric incorporating a relatively low friction coating material of silicone or the like so as to promote the ability to slide over any projecting obstruction.

Upon the completion of deployment, the air bag cushion 30 provides cushioning coverage over the scuttle area at the transition between the hood portion 14 and the lower portion of the windshield 16. In addition, it is contemplated that the deployment of the air bag cushion will cause a degree of bulging deformation across the hood portion 14 which will provide further energy absorption upon collapse in the event of impact thereby giving rise to additional benefit.

Figure 5:
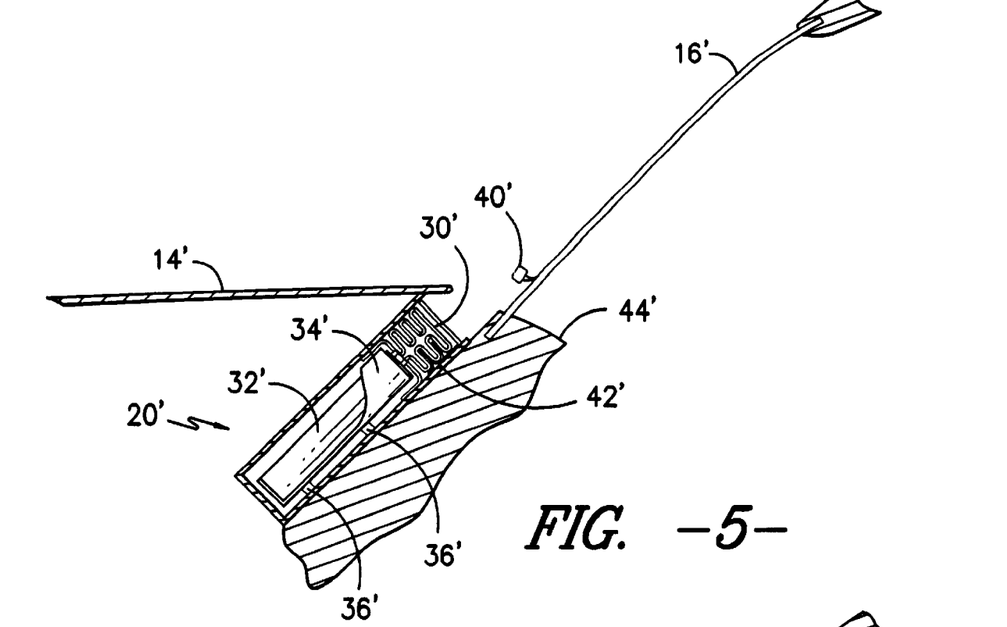
FIG. 5 is a view similar to FIG. 3 but illustrating an alternative orientation for attachment of an air bag assembly according to the present invention.
Figure 6:
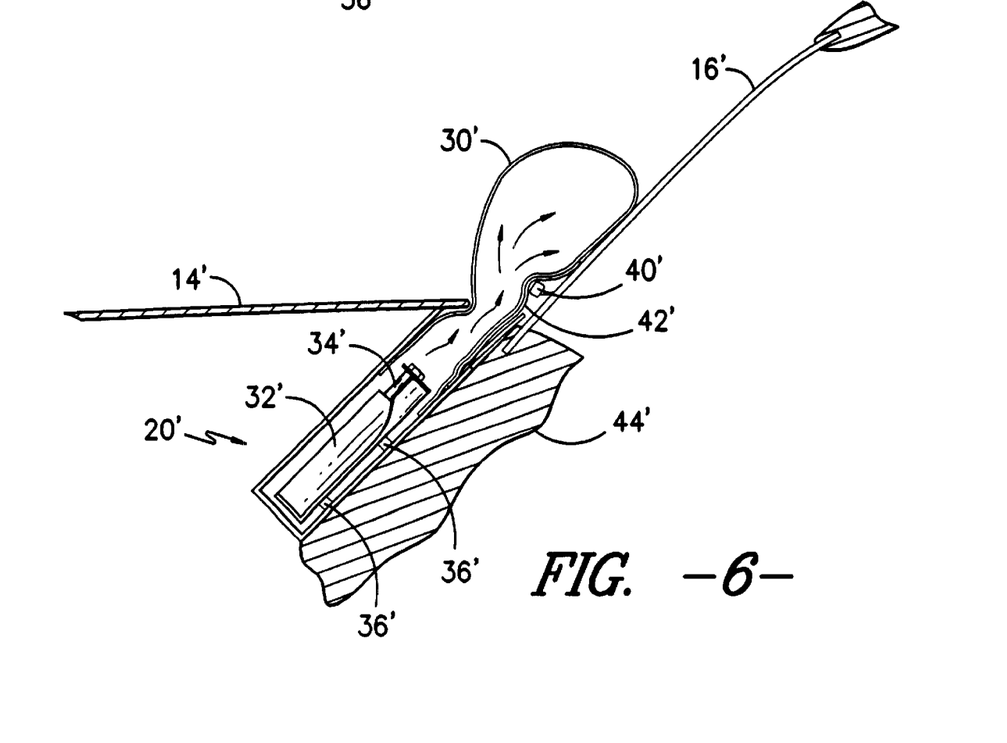
FIG. 6 is a view similar to FIG. 5 illustrating an air bag assembly according to the present invention in partial deployment.

As illustrated in FIGS. 5 and 6, wherein elements corresponding to those previously described are designated by like reference numerals with a prime, it is contemplated that an air bag assembly 20' in accordance with the present invention may be attached at a position directly below the windshield 16'. In the event that such a mounting configuration is utilized, attachment may be effected by mounting elements 36' secured in snap fit or other suitable relation to a support wall 44' as shown. In the event that a mounting configuration as illustrated in FIGS. 5 and 6 is utilized, it is nonetheless contemplated and intended that the deployment of the air bag cushion 30' will be substantially similar to that previously described.

Figure 7:
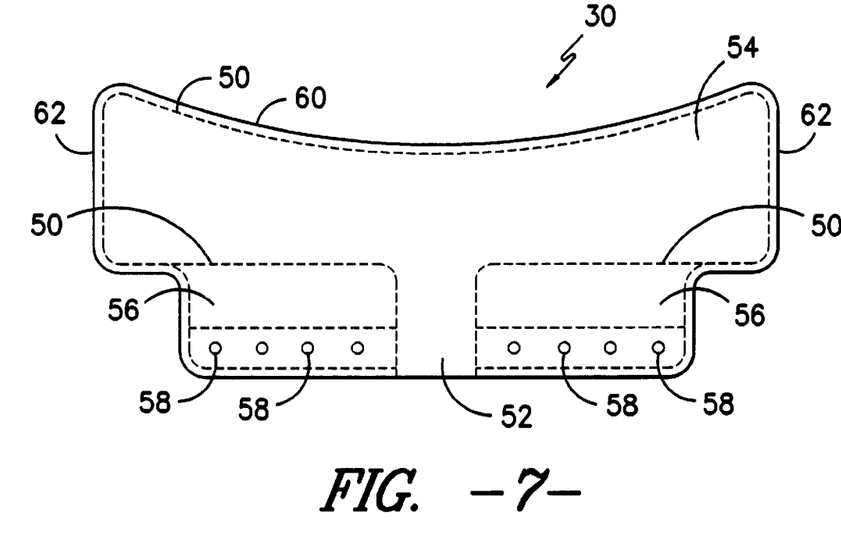
FIG. 7 is an elevational plan view of an inflatable air bag cushion for use in an air bag assembly according to the present invention.

Referring now to FIG. 7, the air bag cushion 30 according to the present invention is preferably formed by joining together two substantially flat mirror image panels of material along seam lines 50 so as to form an expansible volume of desired configuration. As illustrated, according to a potentially preferred construction, the air bag cushion 30 will include an inflation gas travel path 52 into which inflation gas is conveyed by the inflator 32 upon activation. As shown, the inflation gas travel path 52 is in fluid communication with a main inflatable body portion 54 which extends in covering relation across the portion of the windshield 16 and side pillars 22 to be covered. In accordance with the illustrated and potentially preferred embodiment, the air bag cushion 30 includes substantially noninflatable regions 56 which extend adjacent to the inflation gas travel path 52 and below the main inflatable body portion 54. These substantially noninflatable regions 56 are preferably sealed against inflation by the seams 50 interconnecting the panels of material forming the air bag cushion 30. As illustrated, mounting apertures 58 may extend along the lower boundary of the air bag cushion 30 within the substantially noninflatable regions 56 to permit attachment at locations along the width of the vehicle 10 below the windshield 16. Such attachment may be effected by mounting elements such as bolts or the like as will be well known to those of skill in the art.

As shown, according to the illustrated and potentially preferred embodiment of the present invention, the air bag cushion 30 is characterized by a substantially concave upper edge portion 60. As previously indicated, such a concave upper edge portion 60 is believed to facilitate the ability of the operator of the vehicle 10 to maintain visual contact with the outside environment during deployment of the air bag cushion 30 while simultaneously providing coverage over the more rigid portions of the vehicle exterior. The main inflatable body portion 54 also preferably includes lateral edge portions 62 which extend outwardly to a greater width than the substantially noninflatable regions 56 below the main inflatable body portion 54. Such outwardly extending lateral edge portions 62 serve to provide additional coverage over the underlying side pillars 22. Such a configuration is believed to provide inflated cushioning coverage over areas where impact absorption may be desired while at the same time, providing the efficient use of available inflation gas.

Figure 8:
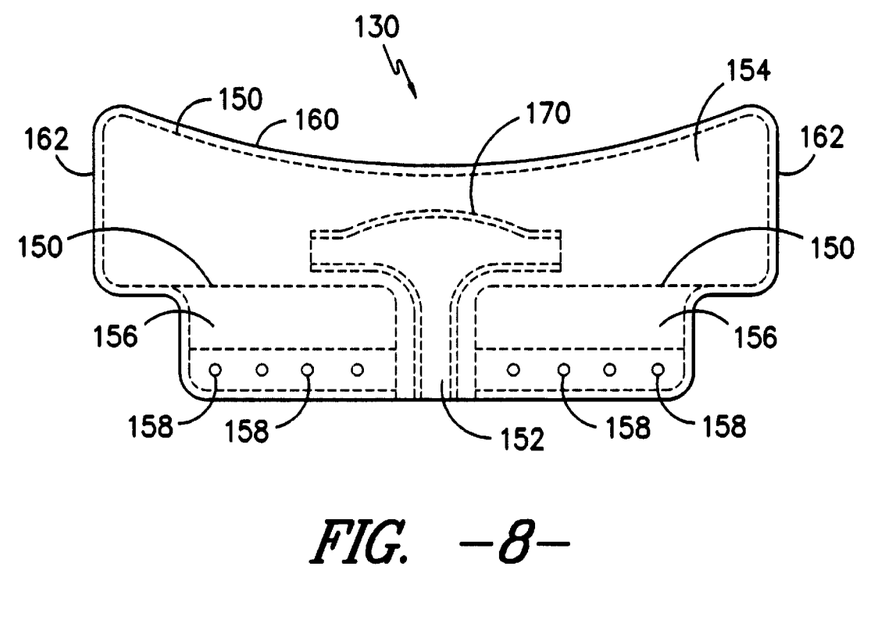
FIG. 8 is a view substantially similar to FIG. 7 but showing in hidden lines the presence of an internally disposed optional heat shield element.

As will be appreciated, depending upon the nature of the inflator 32 which is utilized, the expulsion of inflation gas therefrom may generate some degree of heat. In the event that such heat is believed to be undesirable, it is contemplated that any effects of such heat may be substantially mitigated through utilization of the configuration as illustrated in FIG. 8 wherein elements previously described are designated by like reference numerals increased by 100. As shown, the only difference between the embodiment of FIG. 8 and that of FIG. 7 is the incorporation of an internally disposed gas permeable heat shield element 170 which may be attached directly to the inside of the air bag cushion 130 by appropriate seaming or adhesive bonding techniques. Such a heat shield element 170 may be formed of fabric or other suitable material and provides a degree of protection to the air bag cushion 130 by diffusing the inflation gas over a broad area.

As previously indicated, it is contemplated that the air bag cushion 30, 130 may be formed by seaming together panels of material. By way of example only, and not limitation, it is contemplated that such materials may include textile materials such as woven or knitted fabrics of nylon or polyester. If desired, such materials may include a gas permeability blocking coating of suitable composition. By way of example only, and not limitation, it is contemplated that such coatings may include compositions of silicone, urethanes, acrylics, polyamide dispersions or mixtures thereof. It is contemplated that the panels of material forming the air bag cushion 30, 130 may be joined together by any suitable seaming method yielding a substantially stable connection between the adjoined layers. By way of example only, and not limitation, such methods may include industrial sewing, RF welding, ultrasonic welding, adhesive bonding, or combinations thereof.

While the assembly technique as described for the air bag cushion 30, 130 may involve the seaming together of multiple individual pieces of material, other assembly techniques are also contemplated. By way of example only and not limitation, it is contemplated that the air bag cushion 30, 130 may be formed from a single blank of material which is folded upon itself and seamed in enclosing relation. It is also contemplated that the air bag cushion 30, 130 may be formed as a substantially unitary structure using appropriate interweaving techniques as are well know to those of skill in the art if desired.

It is to be understood that while the present invention has been illustrated and described in connection with certain potentially preferred embodiments, constructions, and procedures, that such embodiments, constructions, and procedures are illustrative only and that the present invention is in no event to be limited thereto. Rather it is contemplated that modifications and variations embodying the principles of the present invention will no doubt occur to those of skill in the art. It is therefore contemplated and intended that the present invention shall extend to all such modifications and variations as may incorporate the broad aspects of the present invention within the full spirit and scope of the appended claims and all equivalents thereto.

What is claimed is:

1. An air bag assembly for cushioning an external scuttle area of an automotive vehicle including a lower portion of a windshield of tile vehicle substantially without obstructing the view of an operator of the vehicle, the air bag assembly comprising:

an in inflator for discharging inflation gas; and an air bag cushion in fluid communication with the inflator for receiving inflation gas therein to inflate the air bag cushion, the air bag cushion including an upper edge portion and an inflatable main body portion disposed below the upper edge portion, such that upon introduction of inflation gas into the air bag cushion the inflatable main body portion extends in inflated relation across an exterior portion of the vehicle from a location below the windshield to a position partially up the surface of the windshield and such that upon deployment of the air bag cushion, the upper edge portion is disposed below a line of sight of an operator of the vehicle whereby said operator maintains visual contact with the exterior environment and wherein the air bag cushion includes at least one substantially noninflatable region disposed below the inflatable main body portion.

2. The invention according to claim 1, wherein said at least one substantially noninflatable region is blocked from inflation by a seam element extending between the inflatable main body portion and said at least one substantially noninflatable region.

3. An air bag assembly for cushioning an external scuttle area of an automotive vehicle including a lower portion of a windshield of the vehicle substantially without obstructing the view of an operator of the vehicle, the air bag assembly comprising:

an inflator for discharging inflation gas; and an air bag cushion in fluid communication with the inflator for receiving inflation gas therein to inflate the air bag cushion, the air bag cushion including an upper edge portion and an inflatable main body portion disposed below the upper edge portion, such that upon introduction of inflation gas into the air bag cushion the inflatable main body portion extends in inflated relation across an exterior portion of the vehicle from a location below the windshield to a position partially up the surface of the windshield and such that upon deployment of the air bag cushion, the upper edge portion is disposed below a line of sight of an operator of the vehicle whereby said operator maintains visual contact with the exterior environment, wherein the air bag cushion comprises panels of woven textile fabric enclosed by seam elements and wherein the woven textile fabric includes a permeability blocking coating layer.

4. An air bag assembly for cushioning an external scuttle area of an automotive vehicle including a lower portion of a windshield of the vehicle substantially without obstructing the view of an operator of the vehicle, the air bag assembly comprising:

an inflator for discharging inflation gas; and an air bag cushion in fluid communication with the inflator for receiving inflation gas therein to inflate the air bag cushion, the air bag cushion including an upper edge portion and an inflatable main body portion disposed below the upper edge portion, such that upon introduction of inflation gas into the air bag cushion the inflatable main body portion extends in inflated relation across an exterior portion of the vehicle from a location below the windshield to a position partially up the surface of the windshield and such that upon deployment of the air bag cushion the upper edge portion is disposed below a line of sight of an operator of the vehicle whereby said operator maintains visual contact with the exterior environment and wherein the air bag cushion further includes an internally disposed gas dispersing heat shield element.

5. An air bag assembly for cushioning an external scuttle area of an automotive vehicle including a lower portion of a windshield of the vehicle and portions of structural pillars disposed along lateral sides of the windshield, the air bag assembly comprising:

an inflator for discharging inflation gas; and an air bag cushion of substantially enclosed seamed construction in fluid communication with the inflator for receipt of inflaton gas therein to inflate the air bag cushion, the air bag cushion including an upper edge portion and an inflatable main body portion disposed below the upper edge portion, the inflatable main body portion including lateral edge portions deployable at least partially over support pillars disposed at the bides of the windshield, such that upon introduction of inflation gas into the air bag cushion the inflatable main body portion is adapted to exterior in inflated relation across an exterior portion of the vehicle from a location below the windshield to a position partially up the surface of the windshield so as to cover the lower edge of the windshield and to at last partially cover a lower portion of the support pillars at the sides of the windshield and such tat upon deployment of the air bag cushion, the upper edge portion is disposed below a line of sight of an operator of the vehicle whereby said operator maintains visual contact with the exterior environment and wherein the upper edge portion of the air bag cushion is characterized by a substantially concave profile and wherein the lateral edge portions are adapted to extend only partially up the support pillars to intermediate positions along the support pillars such that upon deployment of the air bag cushion, upper portions of the windshield and upper portions of the support pillars remain substantially uncovered.

6. The invention according to claim 5, wherein the air bag cushion comprises panels of textile material enclosed by seam elements of a type selected from the group consisting of sewn seams, adhesive bonded seams, and welded seams.

7. An air bag assembly for cushioning an external scuttle area of an automotive vehicle including a lower portion of a windshield of the vehicle and portions of structural pillars disposed along lateral sides of the windshield, the air bag assembly comprising:

an inflator for discharging inflation gas; and an air bag cushion of substantially enclosed seamed construction in fluid communication with the inflator for receipt of inflation gas therein to inflate the air bag cushion, the air bag cushion including an upper edge portion and an inflatable main body portion disposed below the upper edge portion, the inflatable main body portion including lateral edge portions deployable at least partially over support pillars disposed at the sides of the windshield, such that upon introduction of inflation gas into the air bag cushion the inflatable main body portion extends in inflated relation across an exterior portion of the vehicle from a location below the windshield to a position partially up the surface of the windshield so as to cover the lower edge of the windshield and to at least partially cover a lower portion of the support pillars at the sides of the windshield and such that upon deployment of the air bag cushion, the upper edge portion is disposed below a line of sight of an operator of the vehicle whereby said operator maintains visual contact with the exterior environment and wherein the air bag cushion includes at least one substantially noninflatable region disposed below the inflatable main body portion.

8. The invention according to claim 7, wherein said at least one substantially noninflatable region is blocked from inflation by a seam element extending between the inflatable main body portion and said at least one substantially noninflatable region.

9. An air bag assembly for cushioning an external scuttle area of an automotive vehicle including a lower portion of a windshield of the vehicle and portions of structural pillars disposed along lateral sides of the windshield, the air bag assembly comprising:

an inflator for discharging inflation gas; and an air bag cushion of substantially enclosed seamed construction in fluid communication with the inflator for receipt of inflation gas therein to inflate the air bag cushion, the air bag cushion including an upper edge portion and an inflatable main body portion disposed below the upper edge portion, the inflatable main body portion including lateral edge portions deployable at least partially over support pillars disposed at the sides of the windshield, such that upon introduction of inflation gas into the air bag cushion the inflatable main body portion extends in inflated relation across an exterior portion of the vehicle from a location below the windshield to a position partially up the surface of the windshield so as to cover the lower edge of the windshield and to at least partially cover a lower portion of the support pillars at the sides of the windshield and such that upon deployment of the air bag cushion, the upper edge portion is disposed below a line of sight of an operator of the vehicle whereby said operator maintains visual contact with the exterior environment and wherein the air bag cushion further includes an internally disposed gas dispersing heat shield element.

10. An air bag assembly for cushioning an external scuttle area of an automotive vehicle including a lower portion of a windshield of the vehicle and portions of structural pillars disposed along lateral sides of the windshield, the air bag assembly comprising:

an inflator for discharging inflation gas; and an air bag cushion of substantially enclosed seamed construction in fluid communication with the inflator for receipt of inflation gas therein to inflate the air bag cushion, the air bag cushion including an upper edge portion and an inflatable main body portion disposed below the upper edge portion, the inflatable main body portion including lateral edge portions deployable at least partially over support pillars disposed at the sides of the windshield such that upon introduction of inflation gas into the air bag cushion the inflatable main body portion extends in inflated relation across an exterior portion of the vehicle from a location below the windshield to a position partially up the surface of the windshield so as to cover the lower edge of the windshield and to at least partially cover a lower portion of the support pillars at the sides of the windshield and such that upon deployment of the air bag cushion, the upper edge portion is disposed below a line of sight of an operator of the vehicle whereby said operator maintains visual contact with the exterior environment and wherein the air bag cushion further includes a flap-like barrier element disposed across the surface of the air bag cushion to cover elements projecting outwardly from the surface of the vehicle during deployment of the air bag cushion.

11. The invention according to claim 10, wherein the flap-like barrier element comprises a textile fabric.

12. The invention according to claim 10, wherein the flap-like barrier element includes a friction reducing coating.

13. An air bag assembly for cushioning an external scuttle area of an automotive vehicle including a lower portion of a windshield of the vehicle and portions of structural pillars disposed along lateral sides of the windshield, the air bag assembly comprising:

an inflator for discharging inflation gas, and an air bag cushion of substantially enclosed seamed construction in fluid communication with the inflator for receipt of inflation gas therein to inflate the air bag cushion, the air bag cushion including an upper edge portion having a substantially concave profile, an inflatable main body portion disposed below the upper edge portion and at least one noninflatable region disposed below the inflatable main body portion, the inflatable main body portion including lateral edge portions deployable at least partially over support pillars disposed at the sides of the windshields such that upon introduction of inflation gas into the air bag cushion the inflatable main body portion extends of in inflated relation across an exterior portion the vehicle from a location below the windshield to a position partially up the surface of the windshield so as to cover the lower edge of the windshield and to at least partially cover a lower portion of the support pillars at the sides of the windshield and such that upon deployment of the air bag cushion, the upper edge portion is disposed below a line of sight of an operator of the vehicle whereby said operator maintains visual contact with the exterior environment.

14. The invention according to claim 13, wherein the air bag cushion further includes an internally disposed gas dispersing heat shield element.

* * * * *